(12) United States Patent
Kumar et al.

(10) Patent No.: US 8,170,845 B2
(45) Date of Patent: May 1, 2012

(54) METHOD AND APPARATUS FOR AUTOMATIC PERFORMANCE MODELING WITH LOAD DEPENDENT SERVICE TIMES AND OVERHEADS

(75) Inventors: Dinesh Kumar, Tarrytown, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 12/236,824

(22) Filed: Sep. 24, 2008

(65) Prior Publication Data

US 2010/0076733 A1  Mar. 25, 2010

(51) Int. Cl.
G06F 7/60 (2006.01)
G06G 7/62 (2006.01)

(52) U.S. Cl. ............... 703/2; 703/13; 703/17; 702/186

(58) Field of Classification Search ............... 703/2, 13, 703/17; 702/186
See application file for complete search history.

(56) References Cited

U.S. PATENT DOCUMENTS

| | | | |
|---|---|---|---|
| 5,465,354 A | 11/1995 | Hirosawa et al. | |
| 5,946,662 A * | 8/1999 | Ettl et al. | 705/7.26 |
| 6,393,480 B1 | 5/2002 | Qin et al. | |
| 6,567,767 B1 | 5/2003 | Mackey et al. | |
| 6,691,067 B1 * | 2/2004 | Ding et al. | 702/186 |
| 6,973,415 B1 * | 12/2005 | Saghier et al. | 702/186 |
| 7,107,187 B1 * | 9/2006 | Saghier et al. | 702/186 |
| 7,296,256 B2 | 11/2007 | Liu et al. | |
| 7,369,967 B1 * | 5/2008 | Washburn et al. | 702/186 |
| 7,739,099 B2 * | 6/2010 | Liu et al. | 703/22 |
| 2002/0082807 A1 | 6/2002 | Turicchi, Jr. et al. | |
| 2003/0126254 A1 * | 7/2003 | Cruickshank et al. | 709/224 |
| 2004/0010674 A1 * | 1/2004 | Boyd et al. | 711/170 |
| 2004/0059544 A1 * | 3/2004 | Smocha et al. | 702/182 |
| 2005/0086335 A1 * | 4/2005 | Liu et al. | 709/223 |
| 2005/0114583 A1 * | 5/2005 | Beale | 710/308 |
| 2005/0240935 A1 | 10/2005 | Ramanathan | |
| 2007/0168494 A1 | 7/2007 | Liu et al. | |

OTHER PUBLICATIONS

"Queueing Model Based Network Server Performance Control", Sha, Lui, et al. IEEE 2002.*
"Managing Versions of Web Documents in a Transaction-time Web Server". Dyreson, Curtis, et al. May 17-22, 2004.*

* cited by examiner

*Primary Examiner* — Paul Rodriguez
*Assistant Examiner* — Nithya Janakiraman
(74) *Attorney, Agent, or Firm* — F. Chau & Associates, LLC; William J. Stock

(57) ABSTRACT

A method for modeling performance of an information technology system having one or more servers for serving a number of types of transactions includes modeling a service time of each transaction type at each server and a processor overhead at each server as one of a polynomial, exponential, or logarithmic function of the average arrival rate of each transaction type at the corresponding server to generate service time and processor overhead functions and inferring optimal values of coefficients in the service time and processor overhead functions to generate a performance model of the information technology system.

23 Claims, 3 Drawing Sheets

US 8,170,845 B2

METHOD AND APPARATUS FOR AUTOMATIC PERFORMANCE MODELING WITH LOAD DEPENDENT SERVICE TIMES AND OVERHEADS

BACKGROUND

1. Technical Field

The present disclosure relates generally to performance modeling of information technology (IT) systems, and more particularly, to performance modeling of transaction-based distributed software applications.

2. Discussion of Related Art

Performance modeling of computer networks can be an important tool in the capacity planning of computer networks. Performance models of complex software and hardware network architectures can aid in accurately predicting their performance for varying data traffic patterns and workloads.

Transaction-based software applications generate data traffic that includes request/response transaction pairs. Transactions may include requests for service by a computer system. These requests can include collections of sub-requests. For example, a purchase request can include visiting a particular webpage for a product, clicking the buy button, entering account information, clicking the submit button, etc. A transaction-based software application that is deployed over an arbitrary computer network architecture may be considered a transaction-based distributed software application. Each request and response associated with a transaction of the transaction-based distributed software application can be exchanged between different server entities of the computer network.

A performance model of the transaction-based distributed software application deployed over the computer network can be used to predict the performance of the application and take measures to improve it if possible. For example, the model may reveal that a server of the network has an unacceptably high response time in servicing requests of the application, suggesting that an upgrade of that server may improve the application's performance.

Performance models based on traditional queuing theory need certain model parameters to compute performance metrics. The model parameters include service times of different transaction classes and central processing unit (CPU) overheads of computers within a given network. The performance metrics may include average transactional response time, average number of transactions (or jobs) waiting to be processed in a buffer queue, etc. Other conventional techniques that make use of simulations and manual calibrations can also be used to compute these and other similar performance metrics from the model parameters. However, none of these techniques can be used practically if the service time parameters are not known in advance.

Another known conventional technique uses inferencing to generate a load-independent service time and CPU overhead based performance model of an arbitrary computer network architecture. Inferencing allows one to compute the service time parameters from readily available measurement data on end-to-end-response times, overall CPU utilizations, and workload arrival rates. However, this inferencing technique is not reliable unless the arriving transactional workload is stationary.

Real world network traffic and the transactional workload arriving at transaction-based software applications is non-stationary in nature when a window of time is considered. Further, state of the art transaction-based software applications are quite complex in design. Accordingly, end-to-end transactional requests and responses may incur variable service times that depend on the total arriving non-stationary workload.

Thus, there is a need for methods and systems that can accurately model system performance when the arriving transactional workload is non-stationary.

SUMMARY

An exemplary embodiment of the present invention includes a method for modeling performance of an information technology system having one or more servers for serving a number of types of transactions. The method includes modeling a service time of each transaction type at each server and a processor overhead at each server as one of a polynomial, exponential, or logarithmic function of an average arrival rate of each transaction type at the corresponding server to generate respective service time and processor overhead functions and inferring optimal values of coefficients in these service time and processor overhead functions to generate a performance model of the information technology system.

An exemplary embodiment of the present invention includes a method for automated performance modeling of an information technology system. The method includes monitoring transactions exchanged between a plurality of servers of an information technology system to measure an average arrival rate of each transaction type at each server, modeling a service time of each transaction type at each server as one of a polynomial, exponential, or logarithmic function of the average arrival rate of each transaction type at the corresponding server to generate a service time function, modeling a processor overhead at each server as one of a polynomial, exponential, or logarithmic function of the average arrival rate of each transaction type at the corresponding server to generate a processor overhead function, inferring optimal values of coefficients in the service time and processor overhead functions by minimizing a quadratic objective function, determining the service time and processor overhead functions using the inferred optimal values of the coefficients, and generating a performance model of the information technology system from the determined service time and processor overhead functions.

An exemplary embodiment of the present invention includes a system for modeling performance of an information technology system having one or more servers for serving a number of types of transactions. The system includes a monitoring module, a modeling module, and an enhanced inferencing module. The monitoring module monitors the transactions exchanged between the servers to measure an average arrival rate of each transaction type at each server. The modeling module models a service time of each transaction type at each server and a processor overhead at each server as one of a polynomial, exponential, or logarithmic function of the average arrival rate of each transaction type at the corresponding server to generate service time and processor overhead functions. The enhanced inferencing module infers optimal values of coefficients in the service time and processor overhead functions to generate a performance model of the information technology system.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION

Methods and systems for modeling performance of an information technology system are presented herein with reference to FIGS. 1-4. It is to be understood that the methods described herein may be implemented in various forms of hardware, software, firmware, special purpose processors, or a combination thereof. In particular, at least a portion of the present invention may be implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying figures may be implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Exemplary embodiments of the present invention may be implemented in a distributed data processing environment in which end-to-end response time and CPU utilization measurements are compiled and used for the automatic model building. For example, a distributed data processing environment may be used for modeling an online production environment for a commercial Web site.

Figure 1:
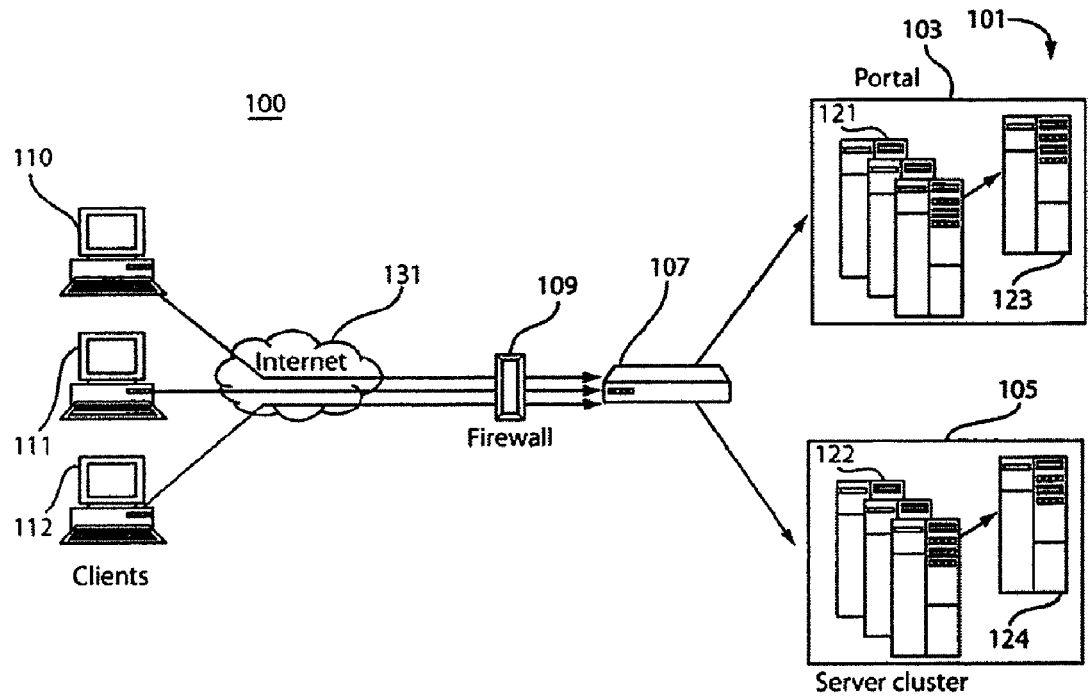
FIG. 1 illustrates an exemplary e-business site architecture which may be modeled in accordance with an exemplary embodiment of the present invention.

FIG. 1 illustrates an exemplary e-business site architecture which may be modeled in accordance with an exemplary embodiment of the present invention. Referring to FIG. 1, a production IT system 100 includes e-business servers, which may be organized to have a multi-tiered architecture and clients 110, 111, and 112. This system 100 is distributed via the Internet 131; however, any network or other distributed system may be employed. In this example, a firewall 109 is employed for security; however each system may include additional or alternate network configurations.

For example, a site 101 may include two separate clusters of servers, including a portal cluster 103 for authentication-related requests and a cluster of business transaction servers 105 for processing business related requests. Within each cluster, there are two or more tiers, front-end servers 121-122, and back-end database servers 123-124. Incoming requests to the site can be routed to a collection of front-end servers 121-122 by a load balancing router 107.

The e-business workload is composed of transactions and requests to the e-business servers. Consider for example an enterprise online shopping scenario. This interaction includes authentication transactions such as login, and business transactions such as browsing a catalog, searching for products, adding items to a shopping cart, proceeding to check out, etc. Each of these transactions may use the site's resources differently.

Transactions such as browsing may only involve the front-end application servers 121-122 to fetch static pages, which is relatively inexpensive, while other transactions such as searching or checking out may involve composition of a dynamic page or multiple queries to the database that need a large amount of processing time and involve both the front-end application servers 121-122 and the back-end database servers 123-124. In addition, user navigational patterns vary from person to person. Some users may spend all their time browsing and searching, while some frequent buyers may buy directly without any searching.

For a production system 100, the e-business workload mix may not be well known. Even though log files recorded by the system can provide some information about load mix, they can be incomplete. A group of geographically distributed probing stations may be used to monitor the IT system's performance. Such probing stations may periodically send out probing requests for different business transactions and measure the end-to-end response times. The end-to-end response times therefore include network delays, which can be different for each geographical location.

Modeling becomes more challenging as the workload (e.g., number of jobs or transactions handled per unit of time) for an IT system used in production environment is not stationary. The workload has peak/off-peak volume, daily/weekly patterns, which can be volatile. It is thus a challenging task to assess an IT system's capability of delivering end-to-end performance assurance across the entire IT environment, given the variety of system architectures, numerous applications with different functions, and the vast diversity in user behavior.

Figure 2:
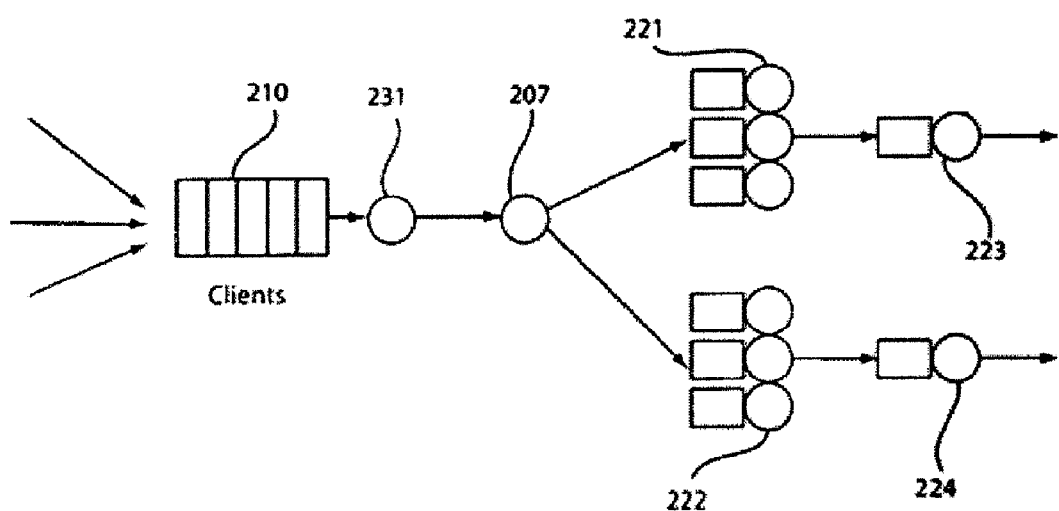
FIG. 2 illustrates an exemplary queuing model corresponding to the e-business site depicted in FIG. 1.

To ensure the feasibility of the modeling framework, yet still capture the characteristics of a complex e-business infrastructure, a queuing model is presented. Referring to FIG. 2 with continued reference to FIG. 1, a high-level multi-class queuing network model 200 is described. This form of model captures resources and delay effects and provides traceability between the performance measures and the system architecture. Each resource component that incurs delays will be modeled by a generic service station with queuing effect. Such a generic service station could have any number of servers. For example, if the delay incurred at the firewall 109 is constant and non-negligible, one could then model the firewall 109 as an infinite server station with constant service time.

The transactions can be characterized and profiled into different classes, so that requests within each class would follow similar paths through the various server stations and incur similar service demands at each station along the path. Such profiling can be based on prior engineering knowledge or after a workload analysis. For example, a login transaction maybe different from a buy transaction and these different transaction sessions would visit a different set of server stations and make different resource demands.

The system described with reference to FIG. 1 can be modeled as an open queuing network 200 of FIG. 2. In FIG. 2, network 231 corresponds to Internet 131 in FIG. 1; network dispatcher 207 corresponds to router 107; clients 210 correspond to clients 110-112 and servers 221-224 correspond to servers 121-124.

Since the delays incurred at the network 231 are non-negligible, such delay effects can be modeled as delay servers. End-to-end delays of a particular job (or transaction) may be described as a total response time (e.g., an end-to-end response time) that a user experiences from the time the user issues a transaction to the time the user receives the complete response. Therefore, the client end-to-end response times include the network delay at the network 231 and the delays at the Web servers 221-224.

From queuing theory, for a single transaction class (or type) hitting a single server, an end-to-end response time R can be represented by equation (1) as follows:

$$R = \frac{s}{1-u}, \quad (1)$$

where, u is represented by equation (2) as follows:

$$u = \lambda s \quad (2).$$

In the above equations, s represents the service time of the given transaction class on the server, R represents the response time of the given transaction class on the server, λ represents the arrival rate of all such transactions on the server, and u represents the utilization of the server. A transaction class refers to a grouping of transactions with similar characteristics. For example the transaction classes may include transactions for searching, buying, logging on, etc. For example, the buying transaction class may include transactions that are responsible for purchasing a particular product. Different transaction classes typically have different service requirements. The above equations may be repeatedly applied to a system that includes multiple computers (e.g., machines) and multiple classes of transactions.

It is assumed that there are K transaction classes and M physical machines in a given network. The parameter C is used to denote the index set of all transaction classes that may have different service requirements or different service level agreement (SLA) targets. The parameter L is used to denote the index set of all the physical machines that are part of the given network. The parameter $\tilde{\gamma}^c$ is used to denote the rate (e.g., workload) at which transactions of a transaction class c∈C arrive from an external source into the network (e.g., through any machine). The parameter $\lambda_i^c$ is used to denote the rate at which transactions of a transaction class c∈C arrive at a machine i∈L from within the network. The parameter $\lambda_i^c$ represents the effective or average arrival rate of transactions of a class c arriving at machine i, whereas the parameter $\tilde{\gamma}^c$ represents the total arrival rate of transactions of a class c being generated by a source outside the network. The effective arrival rate may be computed from the total arrival rate by solving the open Jackson network traffic balance equations in equation (3) as follows:

$$\forall c \in C, \lambda^c = \gamma^c(I-P^c), \quad (3)$$

where $\lambda^c = [\lambda_1^c, \lambda_2^c, \ldots, \lambda_M^c]$, the vector $\gamma^c = [0, 0, \ldots, \tilde{\gamma}^c, \ldots 0]$, $\tilde{\gamma}^c$ is located at some jth position (j∈L) when class c transactions enter the network through machine j, I represents the identity matrix, and $P^c$ represents the traffic routing probability matrix. For example, $P^c = [P_{ij}^c]$ is the probability that traffic corresponding to transactions of class c leaves a machine i and goes to machine j. It is assumed that $P^c$ is well defined for a given network architecture (i.e., the values $P_{ij}^c$ are given).

The parameter $s_i^c$ denotes the service time of a class c transaction at machine i. Equations (1) and (2) above can be repeatedly applied to obtain the service time $s_i^c$ using the following inferencing technique. The response time $R^c$ of traffic class c and utilization $u_i$ of machine i, may be represented respectively by equations (4) and (5) as follows:

$$\forall c \in C, \sum_{i \in L} \alpha_i^c \frac{s_i^c}{1-\tilde{u}_i} + d_{net}^c = R^c, \quad (4)$$

$$\forall i \in L, \sum_{c \in C} \frac{\lambda_i^c}{P_i} s_i^c + o_i^{cpu} = u_i, \quad (5)$$

where, $d_{net}^c$ denotes the total network delay incurred by a class c transaction, $o_i^{cpu}$ denotes the total CPU overhead at machine i, $\alpha_i^c = \lambda_i^c / \tilde{\gamma}^c$ and $P_i$ is the total number of processors (e.g., CPUs) in machine i. One may then seek to minimize the sum of the squares of relative errors $e^c$ and $e_i$ between the analytical entities $R^c$ and $u_i$ given by equations (4) and (5) and their corresponding mean measurement values $\tilde{R}^c$ and $\tilde{u}_i$ obtained from the real network. The corresponding optimization problem would then comprise a quadratic objective function in the set of variables $\{s_i^c, d_{net}^c, o_i^{cpu}, e^c, e_i, c \in C, i \in L\}$, where the quadratic objective function is represented by equation (6) as follows:

$$\min \sum_{c \in C} \left(\frac{e^c}{\tilde{R}^c}\right)^2 + \sum_{i \in L} \left(\frac{e_i}{\tilde{u}_i}\right)^2 \quad (6)$$

with the following set of linear constraints that may be represented by equations (7) and (8) as follows:

$$\forall c \in C, R^c + e^c = \tilde{R}^c \quad (7)$$

$$\forall i \in L, u_i + e_i = \tilde{u}_i, \quad (8)$$

where, $R^c$ and $u_i$ may be given respectively by equations (4) and (5). The solution to the optimization problem represented by the quadratic objective function of equation (6) and the linear constraints of equations (7) and (8) yields the service times $s_i^c$ and CPU overheads $o_i^{cpu}$.

However, the above optimization problem assumes that the arriving workload (e.g., arrival rate of transactions) will be stationary. When the arriving workload is non-stationary, the computers of the network may incur additional processing overheads when mean transactional workload is high as compared to when the mean transactional workload is low. The extra processing overheads may increase with increasing workload, for example, due to higher context-switching and a higher number of interrupts being generated by a network interface card (NIC) at the CPU of each server.

Service times for a particular transaction class at a given machine and total CPU overhead at a given machine may be more at higher mean workloads as compared to a lower mean. Further, an empirical analysis of an actual system has shown that service times and CPU/computer overheads may incur either polynomial, exponential, or logarithmic increases with increasing mean arriving workload. It has been further observed that the sum arriving workload over all transaction classes works as an approximation to incorporate dependence of service times and CPU overheads on the workload of individual transaction classes.

Figure 3:
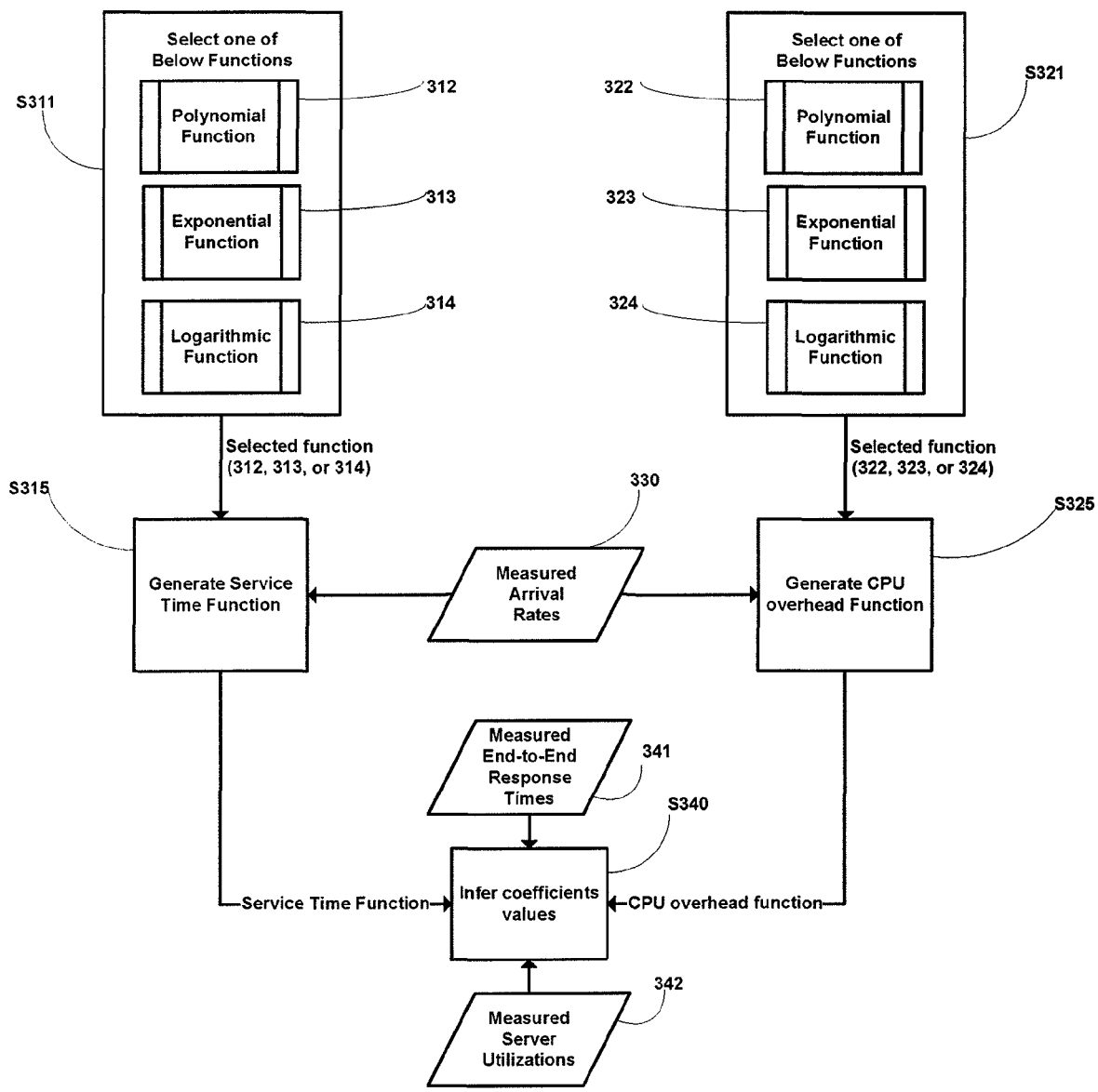
FIG. 3 illustrates a high-level flow chart of a method of modeling performance of an information technology system according to an exemplary embodiment of the present invention.

Accordingly, exemplary methods and systems for modeling system performance presented herein consider the service times and CPU overheads as increasing polynomial, exponential, or logarithmic functions of the total arriving workload. FIG. 3 illustrates a high-level flow chart of method for modeling performance of an information technology system that includes one or more servers. The method includes the selection of one of a polynomial function 312, an exponential function 313, or a logarithmic function 314 for modeling service time (S311). The method further includes the selection of one of a polynomial function 322, an exponential function 323, or a logarithmic function 324 for modeling CPU overhead (S321). The selected functions need not be of the same type. For example, the polynomial function 312 may have been selected for modeling the service time, while the exponential function 323 may have been selected for modeling the CPU overhead.

Service times for transactions of class c at each server may be expressed as a service time function $s_i^c(f\{\lambda_i^c|c \in C\})$ for any given function $f$ by incorporating measured arrival rates $\lambda_i^c$ of each transaction class c at the corresponding server i into the selected function (e.g., 312, 313, or 314) (S315). The CPU overheads may also be expressed as a CPU overhead function $o_i^{cpu}(g\{\lambda_i^c|c \in C\})$ for any given function g by incorporating the measured arrival rates $\lambda_i^c$ 330 of each transaction class c into the selected function (e.g., 322, 323, or 324) (S325). For example, the functions are considered to be $f\{\lambda_i^c|c \in C\} = \Sigma_c \lambda_i^c$ and $g\{\lambda_i^c|c \in C\} = \Sigma_c \lambda_i^c$.

The service time function at machine i for a given transaction class c maybe expressed as one of equations 9, 10, or 11 as follows:

$$s_i^c\left(\sum_c \lambda_i^c\right) = a_{0,i}^c + a_{1,i}^c \sum_c \lambda_i^c + a_{2,i}^c \left(\sum_c \lambda_i^c\right)^2 + \ldots + a_{n,i}^c \left(\sum_c \lambda_i^c\right)^n, \quad (9)$$

$$s_i^c\left(\sum_c \lambda_i^c\right) = a_{0,i}^c + a_{1,i}^c e^{\Sigma_c \lambda_i^c} + a_{2,i}^c \left(e^{\Sigma_c \lambda_i^c}\right)^2 + \ldots + a_{n,i}^c \left(e^{\Sigma_c \lambda_i^c}\right)^n, \quad (10)$$

$$s_i^c\left(\sum_c \lambda_i^c\right) = \tag{11}$$
$$a_{0,i}^c + a_{1,i}^c \log \sum_c \lambda_i^c + a_{2,i}^c \left(\log \sum_c \lambda_i^c\right)^2 + \ldots + a_{n,i}^c \left(\log \sum_c \lambda_i^c\right)^n,$$

where, n represents the degree of the functions. For example, if the polynomial function 312 was previously selected, the service time function would be expressed by equation (9). Further, if the exponential function 313 or logarithmic function 314 were previously selected, the service time function would be respectively expressed as equations (10) or (11).

The CPU overhead function at machine i may be expressed as one of equations (12), (13), or (14) as follows:

$$o_i^{cpu}\left(\sum_c \lambda_i^c\right) = b_{0,i} + b_{1,i} \sum_c \lambda_i^c + b_{2,i} \left(\sum_c \lambda_i^c\right)^2 + \ldots + b_{m,i} \left(\sum_c \lambda_i^c\right)^m, \quad (12)$$

$$o_i^{cpu}\left(\sum_c \lambda_i^c\right) = b_{0,i} + b_{1,i} e^{\Sigma_c \lambda_i^c} + b_{2,i} \left(e^{\Sigma_c \lambda_i^c}\right)^2 + \ldots + b_{m,i} \left(e^{\Sigma_c \lambda_i^c}\right)^m, \quad (13)$$

$$o_i^{cpu}\left(\sum_c \lambda_i^c\right) = \tag{14}$$
$$b_{0,i} + b_{1,i} \log \sum_c \lambda_i^c + b_{2,i} \left(\log \sum_c \lambda_i^c\right)^2 + \ldots + b_{m,i} \left(\log \sum_c \lambda_i^c\right)^m,$$

where, m represents the degree of the function. For example, if the polynomial function 322 was previously selected, the CPU overhead function would be expressed by equation (12). Further, if the exponential function 323 or logarithmic function 324 were previously selected, the CPU overhead function would be respectively expressed as equations (13) or (14).

The previous equations (4) and (5) for response time $R^c$ of a traffic class c and utilization $u_i$ of machine i can then be re-written incorporating the service time function $s_i^c(\Sigma_c \lambda_i^c)$ and the CPU overhead function $o_i^{cpu}(\Sigma_c \lambda_i^c)$ as shown respectively in equations (15) and (16) as follows:

$$\forall c \in C, \sum_{i \in L} \alpha_i^c \frac{s_i^c\left(\sum_c \lambda_i^c\right)}{1 - \tilde{u}_i} + d_{net}^c = R^c, \tag{15}$$

$$\forall i \in L, \sum_{c \in C} \frac{\lambda_i^c}{P_i} s_i^c\left(\sum_c \lambda_i^c\right) + o_i^{cpu}\left(\sum_c \lambda_i^c\right) = u_i. \tag{16}$$

The corresponding optimization problem would then comprise a quadratic objective function in the set of variables $\{a_{p,i}^c, b_{q,i}, d_{net}^c, e^c, e_i|p \in \{0, 1, \ldots, n\}, q \in \{0, 1, \ldots, m\}, c \in C, i \in L\}$, where the quadratic objective function is represented by equation 6, linear constraints may be represented by equations (7) and (8), and $R^c$ and $u_i$ can instead given by equations (15) and (16). For example, a first term of the quadratic objective function of equation (6) incorporates the measured end-to-end response times $\tilde{R}^c$ (341) and the second term incorporates the measured server utilizations $\tilde{u}_i$ (342). The minimizing solution to the optimization problem would yield optimal values of coefficients in the service time and CPU overhead functions (i.e., $a_{p,i}^c$, $b_{q,i}$) (S340).

The determined coefficient values from this enhanced inferencing technique result in purely sum arriving workload dependent service time and CPU overhead formulations. The coefficient values can be plugged into the service time and CPU overhead functions to generate a performance model of the system.

Figure 4:
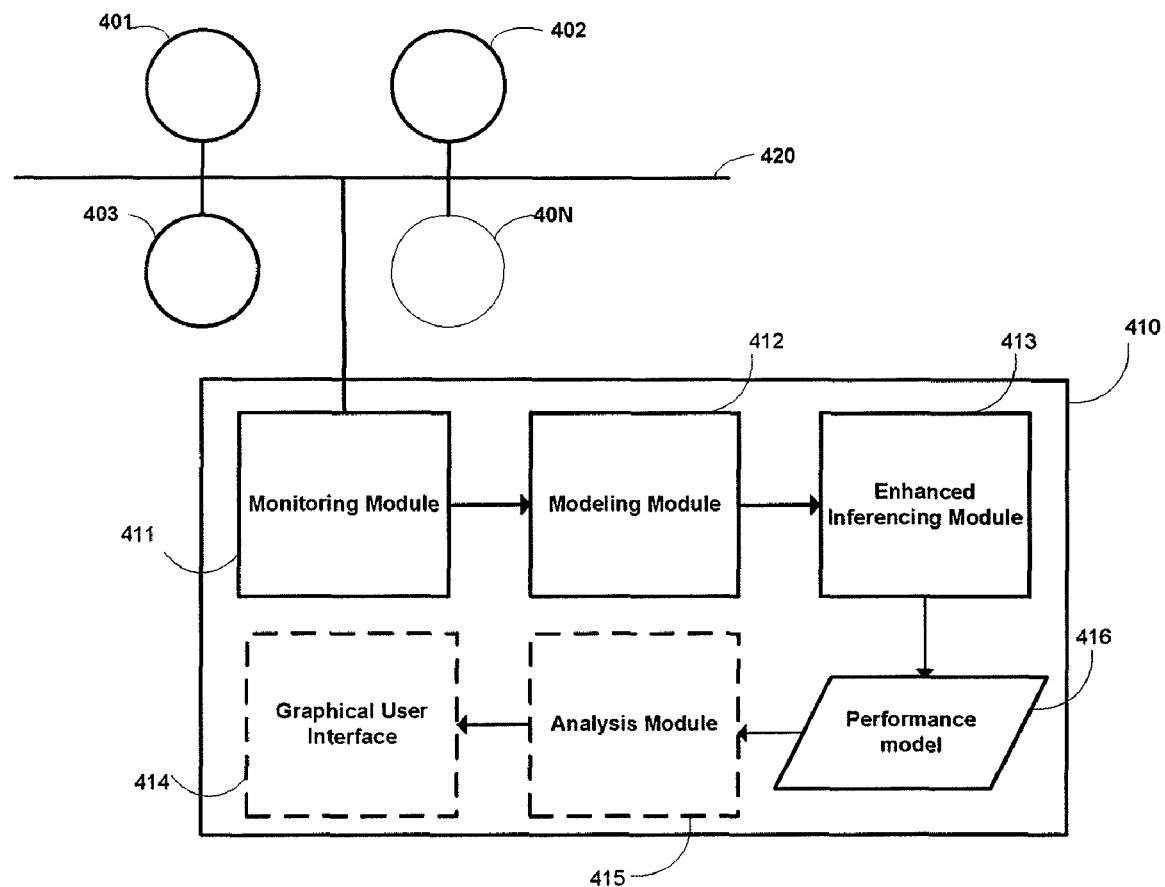
FIG. 4 illustrates a high-level block diagram of a system for modeling performance of an information technology system according to an exemplary embodiment of the present invention.

An exemplary system for generating a performance model for an information technology system having one or more servers is illustrated in FIG. 4, according to an exemplary embodiment of the present invention. The system 410 includes a monitoring module 411, a modeling module 412, and an enhanced inferencing module 413. The system 410 may include an analysis module 415 and/or a graphical user interface 414.

The monitoring module 411 monitors transactions exchanged between servers 401, 402, 403, and 40N of an information technology system (e.g., the system illustrated in FIG. 1) connected through a network 420. The monitoring is used to collect and/or measure average arrival rates of each transaction type at each server. The monitoring module 411 may be further used to monitor the transactions to measure end-to-end response times amongst the servers for each transaction type and utilizations of each server.

The modeling module 412 models a service time of each transaction type at each server and a CPU overhead at each server as one of a polynomial, exponential, or logarithmic function of the average arrival rate of each transaction type at the corresponding server to generate service time and CPU overhead functions.

The enhanced inferencing module 413 infers optimal values of coefficients in the service time and CPU overhead functions to generate a performance model 416 of the information technology system. The enhanced inferencing module 413 may infer the coefficient values using the above described enhanced inferencing technique. The coefficient values may be inferred by minimizing a quadratic objective function. As shown in equations (6)-(8), the quadratic objective function includes a first term based on a relative error $e^c$ between the measured end-to-end response times $\tilde{R}^c$ and modeled end-to-end response times $R^c$ and a second term based on a relative error $e_i$ between the measured utilizations $\tilde{u}_i$ and modeled utilizations $u_i$. As shown in equation (15), the modeled end-to-end response times $R^c$ may be based on the service time function, the measured utilizations $\tilde{u}_i$, and network delays $d_{net}^c$ associated with the exchange of each transaction through each server. As shown in equation (16), the modeled utilizations $u_i$ may be based on the service time function, the CPU overhead function and the total number of processors $P_i$ at each server.

The analysis module 414 analyzes the generated performance model 416 to determine whether improvements should be made to the information technology system. The system 410 may further include a graphical user interface to display the suggested improvements to a user.

It is to be understood that the particular exemplary embodiments disclosed above are illustrative only, as the invention may be modified and practiced in different but equivalent manners apparent to those skilled in the art having the benefit of the teachings herein. Furthermore, no limitations are intended to the herein described exemplary embodiments, other than as described in the claims below. It is therefore evident that the particular exemplary embodiments disclosed herein may be altered or modified and all such variations are considered within the scope and spirit of the disclosure.

What is claimed is:

1. A method for modeling performance of an information technology system having a server for serving a class of transactions, the method comprising:
   modeling a service time for servicing transactions of the class on the server as one of a polynomial, exponential, or logarithmic function that comprises a first term including an average arrival rate of transactions of the class at the server raised to a first power and a second term including the average arrival rate raised to a second power higher than the first to generate a service time function;
   modeling a processor overhead time of a processor of the server as one of a polynomial, exponential, or logarithmic function that comprises a third term including the average arrival rate and a fourth term including the average arrival rate raised to a fourth power higher than the third to generate a processor overhead function;
   optimizing coefficients of the terms of the service time function and coefficients of the terms of the processor overhead function; and
   generating a performance model of the information technology system using the resulting service time and processor overhead functions.

2. The method of claim 1, wherein the optimizing comprises minimizing a quadratic objective function,
   wherein the quadratic objective function comprises:
      a first term based on measured end-to-end response times of each transaction of the class; and
      a second term based on a measured utilization of the server.

3. The method of claim 2, wherein the first term includes an error term that represents a relative error between the measured end-to-end response times and modeled end-to-end response times that are based on the service time function and the second term includes an error term that represents a relative error between the measured utilization and a modeled utilization based on the processor overhead function.

4. A method for automated performance modeling of an information technology system, the method comprising:
   monitoring transactions exchanged between a plurality of servers of an information technology system to measure an average arrival rate of each transaction type at each server;
   modeling a service time for servicing transactions of each transaction type at each server as a function that comprises a first term including an average arrival rate of the transactions of the corresponding transaction type at the corresponding server raised to a first power and a second term including the average arrival rate raised to a second higher power to generate a service time function;
   modeling a processor overhead time of a processor at each server as one of a polynomial, an exponential, or a logarithmic function of the average arrival rate of the transactions of the corresponding transaction type at the corresponding server to generate a processor overhead function;
   optimizing a coefficient in a term in the service time function and a coefficient in a term in the processor overhead function by minimizing a quadratic objective function; and
   generating a performance model of the information technology system from the resulting service time and processor overhead functions.

5. The method of claim 4, wherein the monitoring further comprises monitoring the transactions to measure end-to-end response times between the server and another server for each transaction class and utilizations of each server.

6. The method of claim 5, wherein the quadratic objective function comprises a first term based on a relative error between the measured end-to-end response times and modeled end-to-end response times and a second term based on a relative error between the measured utilizations and modeled utilizations.

7. The method of claim 6, wherein the modeled end-to-end response times are based on the service time function.

8. The method of claim 7, wherein the modeled end-to-end response times are further based on the measured utilizations.

9. The method of claim 8, wherein the modeled end-to-end response times are further based on network delays associated with the exchange of each transaction type through the servers.

10. The method of claim 6, wherein the modeled utilizations are based on the service time function.

11. The method of claim 10, wherein the modeled utilizations are further based on the processor overhead function.

12. The method of claim 11 wherein the modeled utilizations are further based on a total number of processors in the servers.

13. The method of claim 4, wherein the processor overhead time is based on the processor engaging in context-switching.

14. The method of claim 13, wherein the processor overhead time is further based on the processor servicing interrupts.

15. A program storage device readable by machine, tangibly embodying a program of instructions executable by the machine to perform method steps for modeling performance of an information technology system including a plurality of servers, the method steps comprising:
   monitoring transactions exchanged between a plurality of servers of an information technology system to measure an average arrival rate of each transaction type at each server;
   modeling a service time of each transaction type for servicing transactions at each server as one of a polynomial, exponential, or logarithmic function that comprises a first term including a summation of arrival rates of the transactions of the corresponding transaction type at the corresponding server that is raised to a first power and a second term including the summation raised to a second power higher than the first to generate a service time function;

modeling a processor overhead time of a processor at each server as one of a polynomial, exponential, or logarithmic function of the average arrival rate of each transaction type at the corresponding server to generate a processor overhead function;

optimizing a coefficient in a term in the service time function and a coefficient in a term in the processor overhead function by minimizing a quadratic objective function; and generating a performance model of the information technology system from the resulting service time and processor overhead functions.

16. The program storage device of claim 15, wherein the monitoring further comprises monitoring the transactions to measure end-to-end response times amongst the servers for each transaction type and utilizations of each server.

17. The program storage device of claim 16, wherein the quadratic objective function comprises a first term based on a relative error between the measured end-to-end response times and modeled end-to-end response times and a second term based on a relative error between the measured utilizations and modeled utilizations.

18. The program storage device of claim 17, wherein the modeled end-to-end response times are based on the service time function.

19. The program storage device of claim 18, wherein the modeled end-to-end response times are further based on the measured utilizations.

20. The program storage device of claim 19, wherein the modeled end-to-end response times are further based on network delays associated with the exchange of each transaction type through the servers.

21. The program storage device of claim 17, wherein the modeled utilizations are based on the service time function.

22. The program storage device of claim 21, wherein the modeled utilizations are further based on the processor overhead function.

23. The program storage device of claim 22, wherein the modeled utilizations are further based on a total number of processors in the servers.

* * * * *